UNITED STATES PATENT OFFICE.

DOROTHY HALL, OF LOS ANGELES, CALIFORNIA.

PLASTIC COMPOSITION SUITABLE FOR MAKING CARVED FLOWER-BEADS AND PROCESS OF MAKING THE SAME.

1,253,236.       Specification of Letters Patent.    Patented Jan. 15, 1918.

No Drawing. Application filed April 5, 1915, Serial No. 19,339. Renewed November 16, 1917. Serial No. 202,423.

*To all whom it may concern:*

Be it known that I, DOROTHY HALL, a citizen of the United States, residing at Los Angeles, in the county of Los Angeles and State of California, have invented new and useful Improvements in Plastic Compositions Suitable for Making Carved Flower-Beads and Processes of Making the Same.

It is an object of my invention to devise a process whereby carved flower beads suitable for necklaces and similar articles may be produced which are superior in hardness and density and which have a beautiful velvet gloss.

Another object of the invention is to devise a method whereby the same may be easily manufactured producing beads which will be durable and which may be worn without fear of discoloring the skin or garment.

I use the following ingredients for compounding the composition of the carved flower beads, the proportions given being by weight:

| | |
|---|---|
| Corn starch | 40 parts |
| Potato dextrin | 10 " |
| Gum tragacanth | 4 " |
| Common salt | 3 " |

These ingredients are pulverized and thoroughly mixed together. Water, preferably luke warm, is now added in quantity sufficient to make a paste of the consistency of chewing gum. Any desired color or tint is imparted to the composition by previously dissolving in the water the color with which it is desired to tint the beads.

The composition is now allowed to stand in an air tight receptacle for approximately twenty-four hours to undergo an aging process. The dextrin in the composition acts as a binder for holding the starch particles together while the gum tragacanth slowly absorbs the moisture within the composition and in doing so swells and becomes a mucilagenous paste. Gum tragacanth, as well known, is not soluble in water. The salt, in combination with the other ingredients, serves to harden the resulting beads and the dextrin and, probably to some extent, the gum tragacanth also, prevents the salt from crystallizing when the water is removed from the composition in the subsequent drying.

At the end of twenty-four hours the composition is now molded or worked into the desired shape such as beads or elongated beads, brooches, watch fobs and the like, with configurations in the shape of petals of flowers or other designs. The composition has the plasticity and consistency of a piece of chewing gum after it has been thoroughly chewed. Perfume, if desired, is added to the composition just before molding and "carving," as the operation of impressing various shapes of petals and such like on the beads is called.

It is essential that the beads be uniformly dried, otherwise stresses will be set up in the beads resulting in cracks and fissures therein. The beads are placed in a chamber containing humidified air somewhat below the saturation point. After a few days the beads are hardened and ready for use.

While the proportions of the ingredients above given may be slightly varied, the best results will be secured by closely following the directions.

The paste suitable for making beads and similar articles may be sold as an article of commerce.

I claim:

1. A composition of matter consisting of a plastic paste comprising starch, dextrin, gum tragacanth, salt, and coloring matter, substantially as described.

2. A process of making carved flower beads, comprising adding water to a powdered mixture of starch, dextrin, gum tragacanth and common salt to form a plastic mass, allowing said mass to undergo an aging process for approximately twenty-four hours in an air tight receptacle, shaping the mass into beads, and drying said beads in a moist atmosphere, substantially as described.

3. A process of making carved flower beads, comprising adding water to a powdered mixture consisting of starch 40 parts, dextrin 10 parts, gum tragacanth 4 parts, and common salt 3 parts, to form a plastic mass, allowing said mass to stand for approximately twenty-four hours, shaping said mass into beads and drying said beads in a moist atmosphere, substantially as described.

4. An article of manufacture consisting of a carved flower bead composed of corn starch, dextrin, gum tragacanth, and common salt.

5. An article of manufacture consisting of a carved flower bead composed of corn starch 40 parts, dextrin 10 parts, gum tragacanth 4 parts, and common salt 3 parts.

In witness that I claim the foregoing I have hereunto subscribed my name this 30th day of March, 1915.

DOROTHY HALL.

Copies of this patent may be obtained for five cents each, by addressing the "Commissioner of Patents. Washington, D. C."